United States Patent [19]

Gentile

[11] Patent Number: 5,455,986
[45] Date of Patent: Oct. 10, 1995

[54] LEAKPROOF INSERT

[75] Inventor: Robert A. Gentile, New Milford, Conn.

[73] Assignee: Emhart Inc., Newark, Del.

[21] Appl. No.: 109,542

[22] Filed: Aug. 19, 1993

Related U.S. Application Data

[63] Continuation-in-part of Ser. No. 744,083, Aug. 12, 1991, abandoned.

[51] Int. Cl.$^6$ .................................................. F16L 5/00
[52] U.S. Cl. .................................................. 16/2
[58] Field of Search .................................. 16/2, 3

[56] References Cited

U.S. PATENT DOCUMENTS 2,751,809  6/1956  Barker .......................... 16/2

OTHER PUBLICATIONS

Dodge Catalog, May 21, 1993.

*Primary Examiner*—P. Austin Bradley
*Assistant Examiner*—Chuck Y. Mah
*Attorney, Agent, or Firm*—E. D. Murphy

[57]  ABSTRACT

A metal insert, usually threaded, for use in a prepared hole in a plastic part and a method for its installation. The upper parts of the hole and the insert and fit together by melting the plastic. After cooling, expandable ridges in the lower part of the insert are forced into the cooled plastic to make the entire assembly leakproof. An intermediate thinned section of the insert permits the expansion of the ridges and itself permanently deforms to maintain the leakproof connection.

14 Claims, 3 Drawing Sheets

LEAKPROOF INSERT

The application is a continuation-in-part of my U.S. application Ser. No. 07/744,083 filed Aug. 12, 1991, now abandoned, the entire disclosure of which is hereby incorporated by reference as if here set forth in full.

FIELD OF THE INVENTION

The present invention relates to a leakproof metal insert and method for post molded use in plastic products.

BACKGROUND OF THE INVENTION

Metal inserts are commonly used to enhance the structural and/or functional performance of plastic parts These inserts are usually hollow and are also often internally threaded. They may be installed by ultrasonically or electrically heating the insert, to thus melt the adjacent plastic, and then pressing the insert into a prepared hole in the plastic part while the plastic defining the hole is molten. These inserts have been designed with knurls, undercuts, fins and the like on their external surfaces which are subsequently filled with melted plastic during installation to thus provide resistance to tension and torque. In addition, sealing rings and/or adhesive have been used to make sure that a leakproof pressure tight seal will be established between the outside surface of the insert and the surface of the hole in the plastic.

More specifically, these inserts are installed (utilizing heat or ultrasonic/vibrational energy) into holes which were formed during the part molding process Installation is achieved by heating the insert above the melting point of the plastic and by applying a downward force to the insert. As the insert is pushed into the molten plastic defining the hole, the remelted plastic flows around the outside of the insert filling the knurls and undercuts. When the plastic cools and hardens it effectively anchors the insert in place. However, when the plastic cools it shrinks slightly leaving a small gap or gaps between the insert and the parent plastic material resulting in an assembly which exhibits leakage between the insert outside diameter and the plastic parent material.

OBJECTS AND ADVANTAGES OF THE INVENTION

It is an object of the present invention to provide an improved insert and method of installation of the improved insert which will establish the desired leakproof pressure tight seal without the use of additional seal elements such as O rings or adhesives.

An advantage of the present invention is that the seal defined by the insert is not sensitive to variations arising during the plastic part molding process or the insert installation method.

The improved insert of the invention includes an expandable internally unthreaded lower section having a series of additional external annular ridges. A leakproof insert assembly is achieved in accord with the method of this invention by expanding this lower section of the insert into the plastic after the plastic has cooled and shrunk away from the insert. Expansion of the lower section closes the gap and applies a compressive force to the plastic material. After the expanding tool is deactivated, the now expanded annular ridges maintain the plastic in compression and keep the air gap closed.

In the insert of this invention, a thinned connecting portion is provided between the upper and lower sections of the insert. This thinned section allows easier deformation of the annular ridges. The thinned section itself also permanently deforms during the expansion of the annular ridges.

BRIEF DESCRIPTION OF THE DRAWINGS

Other objects and advantages of the present invention will become apparent from this specification and from the accompanying drawing which also forms a part of this disclosure, and in which.

DESCRIPTION OF THE PREFERRED EMBODIMENT

Figure 2:
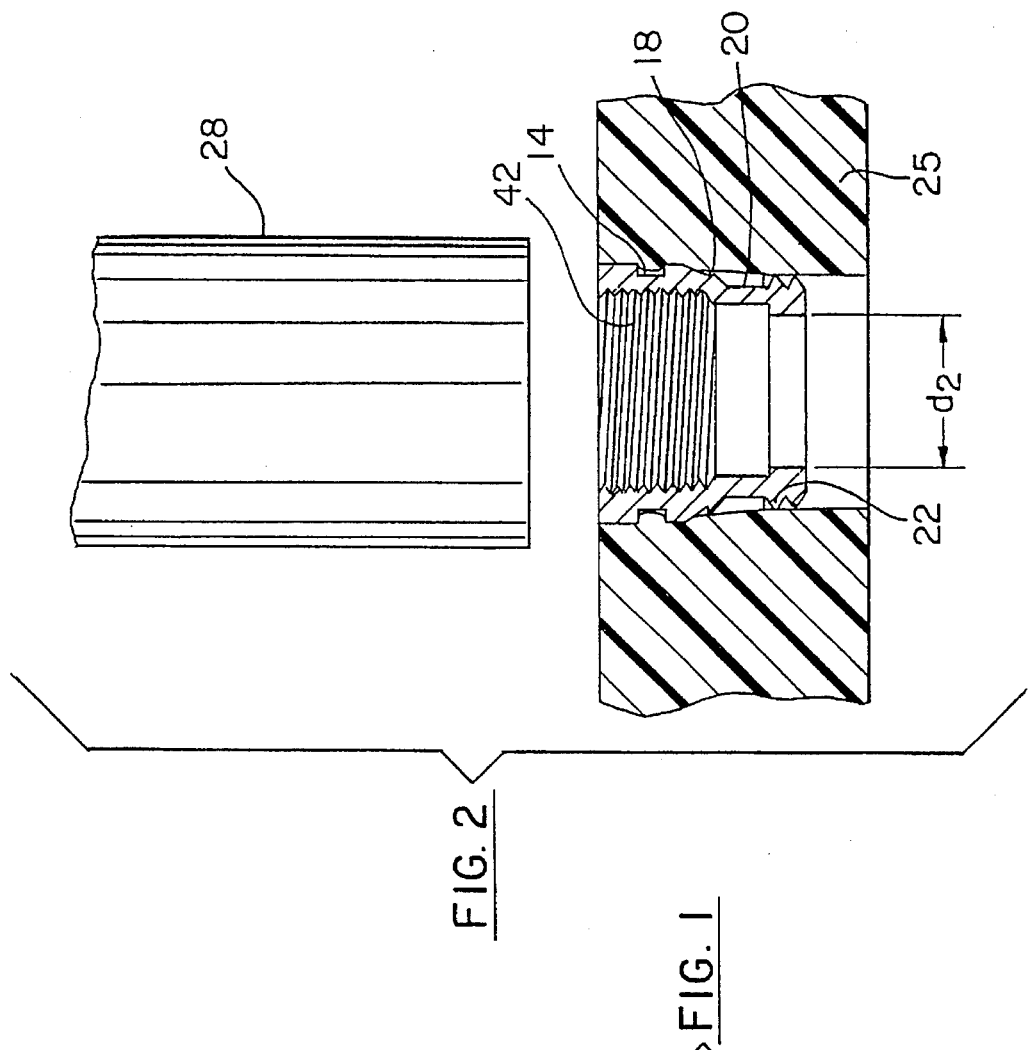
FIG. 2 is a side view of the cylindrical threaded insert after it has been installed by an insertion tool.
Figure 1:
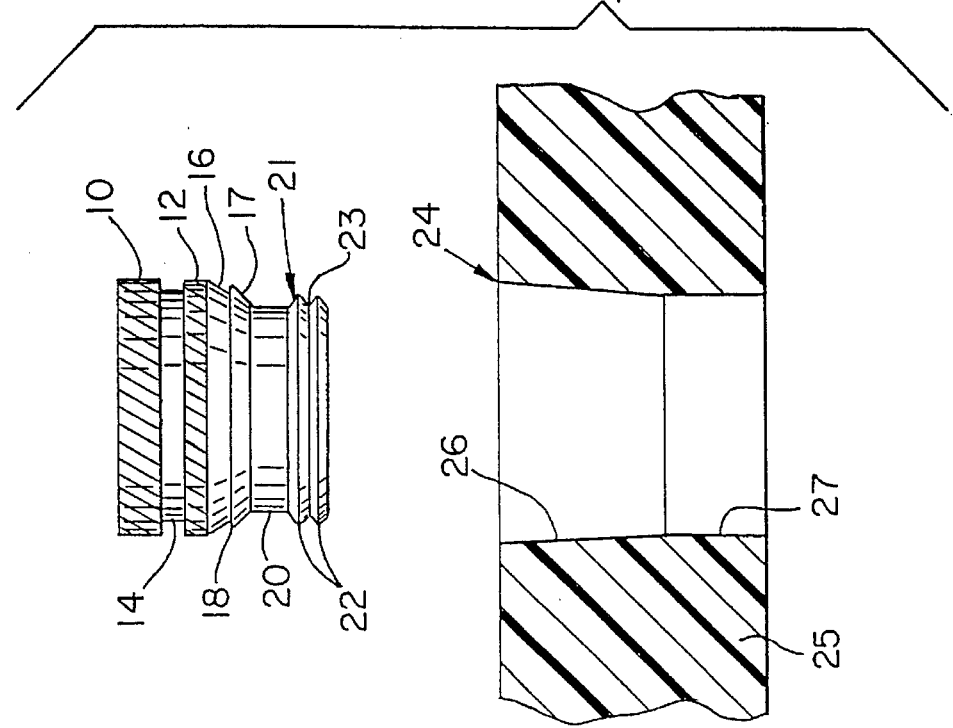
FIG. 1 is a side view of a cylindrical screw threaded insert which is to be sealed within a hole defined in a plastic part.
Figure 3:
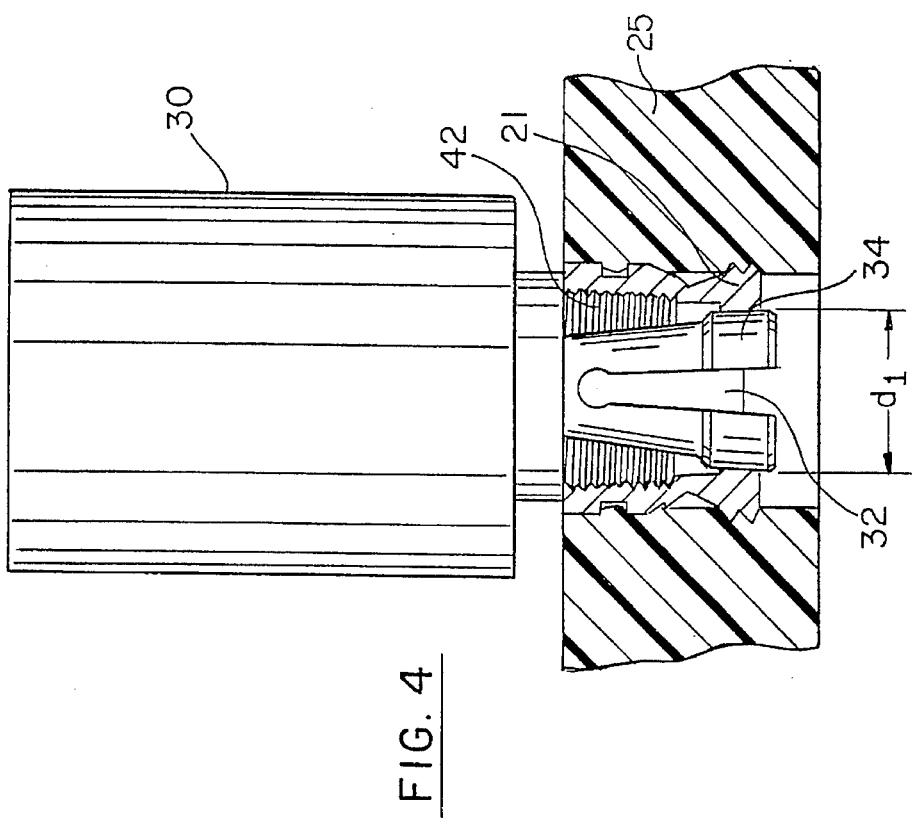
FIG. 3 is a side view of the cylindrical insert as shown in FIG. 2 with an expanding tool in place.

The invention insert for post molded use in plastic parts is preferably cylindrical and has cylindrical knurled surfaces 10, 12 separated by an annular groove 14 at the top of the insert. Below the lower knurled surface 12 are adjacent upper and lower inwardly tapered surfaces 16 and 17 which define an annular sharp edge 18 at their juncture The insert as thus far described corresponds to prior art inserts. Thus, the parts 10–18 shown are typical only; many variations are known and can be used with the invention.

According to the present invention this insert is extended downwardly with a reduced diameter thin wall portion 20 which merges into a bottom annular portion 21 having a pair of external annular ridges 22 separated by a groove 23.

The cylindrical insert is to be installed into a receiving hole 24 in a plastic part 25. The hole 24 has an upper downwardly and inwardly tapered portion 26 and a constant diameter lower portion 27. The diameter of the constant diameter lower portion 27 corresponds to the outer diameter of the bottom annular portion 21 of the insert. The opening diameter of hole 24 corresponds to the outer diameter of the cylindrical knurled surfaces 10, 12 and the taper of the upper downwardly and inwardly tapered portion is selected so that insertion will result in plastic being deformed into the annular groove 14 and around the annular sharp edge 18. The insert is installed (FIG. 2) by using a conventional insertion tool 28 which uses electrical or ultrasonic energy to heat the metal insert to melt the surrounding plastic in hole 24, and which then presses the insert into the hole.

Figure 4:
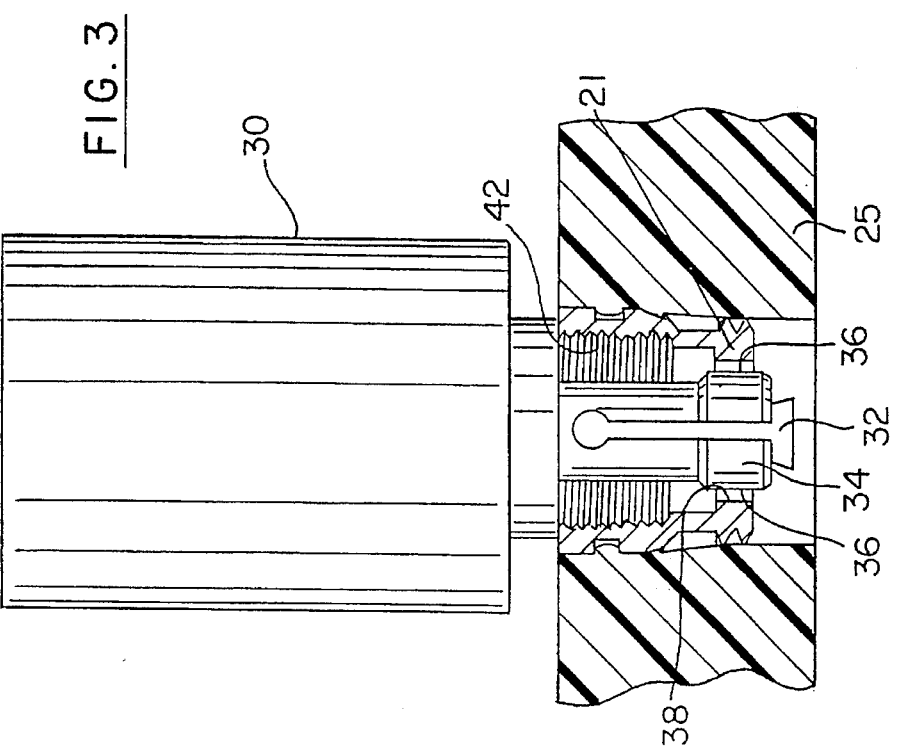
FIG. 4 is a view similar to FIG. 3 with the expanding tool fully actuated.
Figure 5:
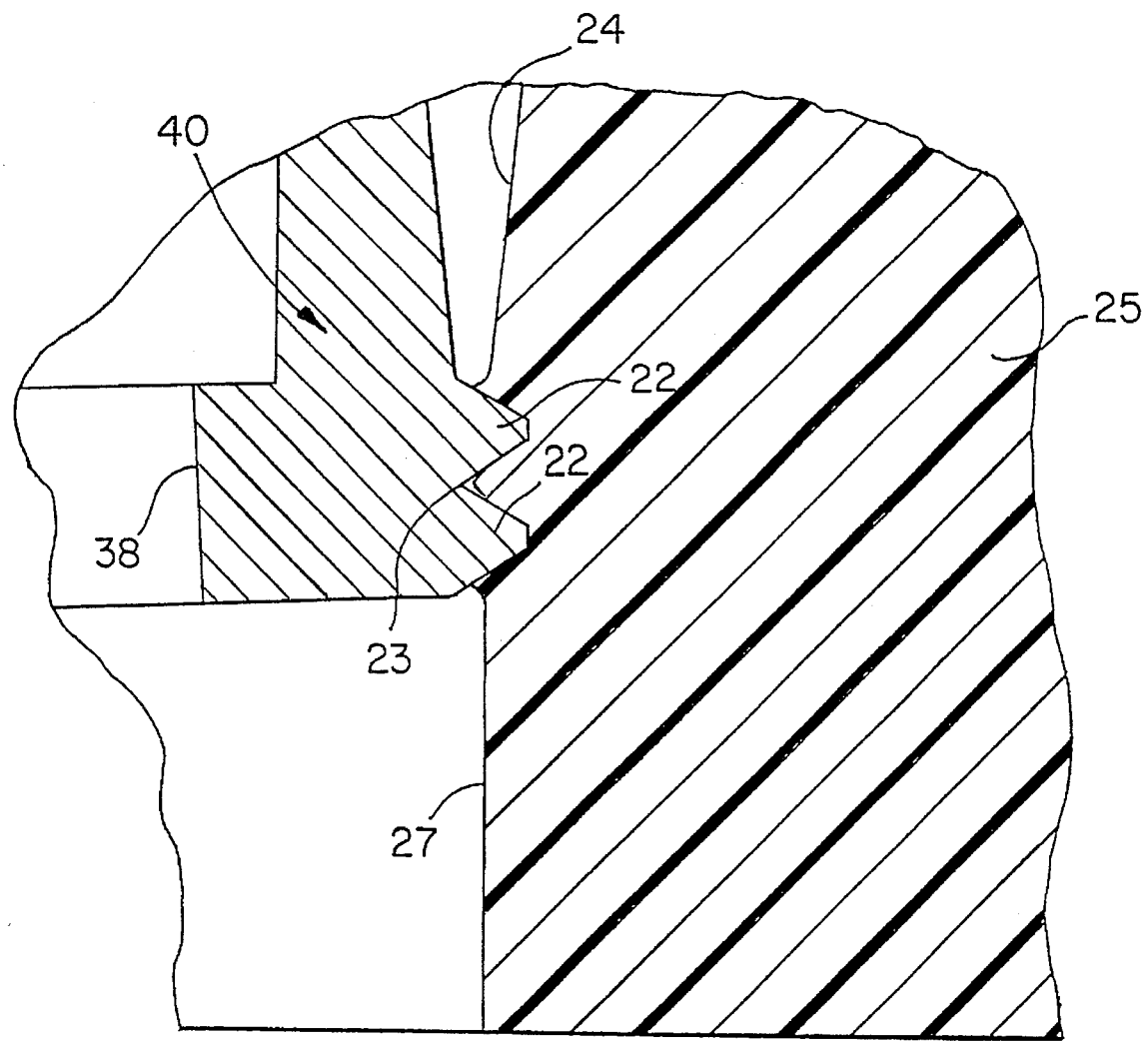
FIG. 5 is an enlarged showing of a portion of FIG. 4 with the expansion of the lower portion into sealing engagement with the plastic.

After the plastic has cooled and all the shrinkage of the plastic away from the insert has occurred, the next step of the invention method can be practiced. An expanding tool 30 having a draw bar 32 operatively associated with a split expander 34 is positioned so that operation of the expanding tool by drawing the draw bar upwardly will force the expander surfaces 36 against the inner diameter 38 of the bottom annular portion 21 permanently deforming this portion outwardly into the plastic body 25. The thin wall reduced diameter portion 20 also permanently deforms as shown in the drawings to thus facilitate and hold the expanded ridges 22 in place in the plastic. This occurs while all the parts are cool. The wall thickness of the thin wall portion 20 is substantially less than the wall thickness of the lower portion 21. Specifically the wall thickness of the portion 20 is in the range of 10% to 30% of the wall thickness of the lower portion 21. The advantages provided by the difference in wall thickness are that it causes the deformation produced by the expansion tool to occur within the thin wall of portion 20 as shown in FIG. 4, thus permitting expansion of the lower portion 21 into sealing engagement with the plastic as shown in FIG. 5, and it further causes the deformation to be permanent by reducing springback. Preferably, the wall thickness of the portion 20 may be about 20% of the wall thickness of the lower portion 21 measured at the bottom of the groove 23.

The inner diameter d1 (FIG. 4) of the expanded bottom portion 21 is accordingly substantially increased from its original dimension d2 (FIG. 2) and this change is controlled by the start clearance between the expander surfaces of the unexpanded expander and the original inner diameter d2. The cross section 40 of the bottom portion (FIG. 5) behind the ridges 22 is sufficiently massive so that the configuration of this cross section will remain substantially unchanged after its forced expansion. The insert is hollow and the top portion 42 of the hole through the insert may be threaded to receive a threaded connection (not shown).

While the invention has been shown and described in detail herein, it is to be understood that this detailed description in by way of example only, and the protection granted is to be limited only by the spirit of the invention and the scope of the following claims.

I claim:

1. A method of mounting a hollow metal insert in a prepared hole in a plastic part in a leakproof manner comprising the steps of:

forming said hole to have a top portion tapering downwardly and inwardly from an opening diameter to a constant reduced diameter lower portion;

forming said insert to have an upper cylindrical portion having means for interconnecting the metal insert and the plastic part at said top portion of said hole, and a lower cylindrical portion including annular outwardly projecting ridge means defining an outer diameter substantially corresponding to said constant reduced diameter of said hole;

placing said insert in contact with said hole;

applying energy to said insert sufficiently to melt the plastic defining said hole and to cause said melted plastic to flow into said interconnecting means;

allowing said melted plastic to cool and shrink; and expanding said outwardly projecting ridge means into the cooled plastic forming said constant reduced diameter lower portion of said hole to form a leakproof pressure tight seal between said insert and said plastic part.

2. The method of claim 1, wherein said step of forming said insert includes a further step of forming said insert with an intermediate portion interconnecting said upper and lower cylindrical portions, and forming said intermediate portion with an outer diameter smaller than said lower cylindrical portion outer diameter.

3. The method of claim 1, wherein said step of forming said insert includes a further step of forming said insert with an intermediate portion interconnecting said upper and lower cylindrical portions, and forming the radial wall thickness of said intermediate portion to be thinner than the radial wall thickness of said lower cylindrical portion.

4. The method of claim 1, wherein the step of forming said insert includes a further step of forming said interconnecting means of said insert by forming a pair of annular knurled surfaces and an annular groove therebetween.

5. The method of claim 4, wherein said step of forming said interconnecting means of said insert includes a further step of forming upper and lower annular inwardly tapered surfaces which define an annular sharp edge at their junction.

6. The method of claim 1, wherein said step of forming said insert includes a further step of forming said ridge means of said insert by forming a pair of ridges separated by a groove.

7. A method of forming a leakproof pressure tight seal between a metal insert and a pre-formed hole in a plastic part in which the insert is to be inserted; comprising the steps of forming said insert with an upper portion having joining means for cooperation with melted plastic, a lower portion having mechanically responsive leakproof sealing means, and an intermediate portion interconnecting said upper and lower portions; inserting said insert into said hole and applying heat sufficient to melt portions of the plastic of said part at least in the vicinity of said upper portion to cause the melted plastic to join to said insert at said joining means, allowing said insert and said plastic part to cool, and expanding said lower portion of said insert and permanently deforming said intermediate portion of said insert to thereby create a leakproof pressure tight seal between said lower portion of said insert and the cooperating portion of said hole in said plastic part.

8. The method of claim 7, wherein said step of forming said insert includes a further step of forming said intermediate portion with an outer diameter smaller than said lower portion outer diameter.

9. The method of claim 7, wherein said step of forming said insert includes a further step of forming the radial wall thickness of said intermediate portion interconnecting said upper and lower portions to be thinner than the radial wall thickness of said lower portion.

10. The method of claim 7, wherein said step of forming said insert includes a further step of forming said lower portion sealing means as a pair of annular ridges separated by an annular groove.

11. The method of claim 10, wherein said step of forming said insert includes a further step of forming the radial wall thickness of said intermediate portion interconnecting said upper and lower portions to be thinner than the radial wall thickness of said lower portion.

12. The method of claim 7, wherein said step of forming said insert includes a further step of forming said joining means of said insert by forming a pair of annular knurled surfaces and an annular groove therebetween.

13. The method of claim 12, wherein said step of forming said insert includes a further step of further forming said joining means of said insert by forming upper and lower tapered surfaces which define an annular sharp edge at their junction.

14. A sealable metal insert for post molded use in a plastic part having a corresponding receiving hole having a top portion tapering inwardly from an opening diameter to a constant reduced diameter portion comprising;

an upper cylindrical portion for interconnecting the metal insert and the plastic part, said upper cylindrical portion including cylindrical knurled surface means, the outer diameter of said knurled surface means substantially corresponding to the opening diameter of the hole, a lower cylindrical portion including annular outwardly projecting ridge means defining an outer diameter substantially corresponding to the reduced diameter of the hole, and an intermediate annular portion interconnecting said upper and lower cylindrical portions, said intermediate annular portion having an outer diameter smaller than said lower portion outer diameter, the radial wall thickness of said intermediate annular portion being 10% to 30% of the radial wall thickness of said lower cylindrical portion, said lower cylindrical portion including a cylindrical inner diameter selectively sized to cooperate with the surfaces of a split expander so that as a draw bar of the split expander is operated said lower cylindrical portion will be expanded outwardly embedding said annular outwardly projecting ridge means in the plastic part establishing therewith a leakproof pressure tight seal after removal of the expander.

* * * * *